No. 625,829.  
G. COOK.  
AUTOMATIC FISHING DEVICE.  
(Application filed Nov. 12, 1898.)  
Patented May 30, 1899.
(No Model.)
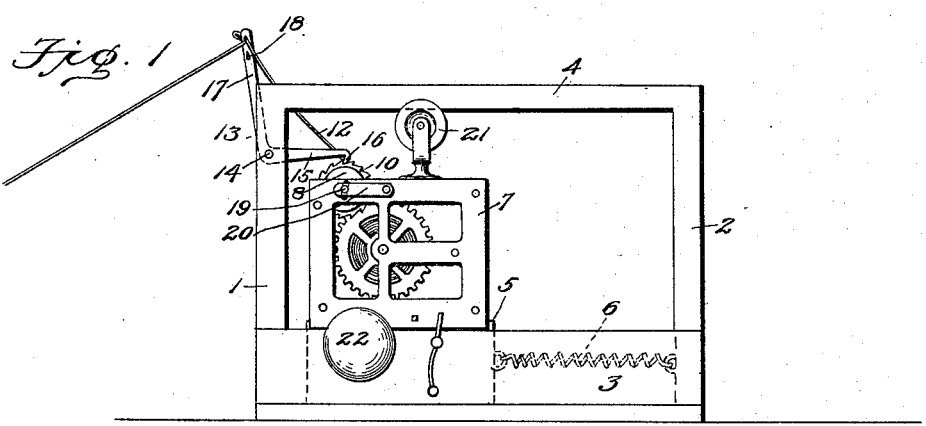
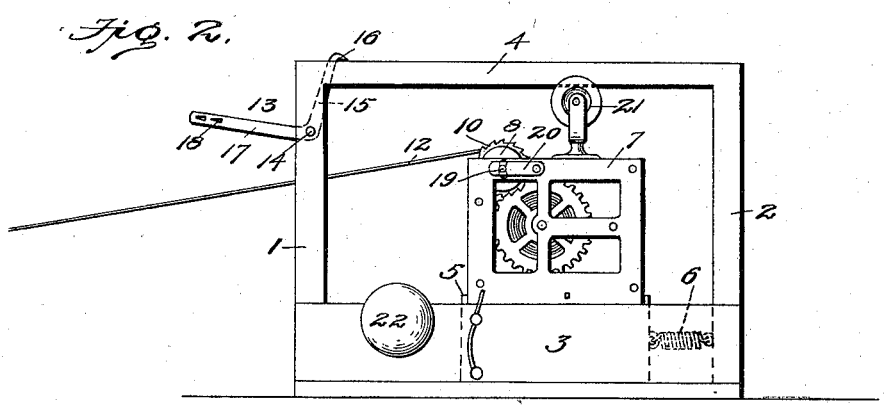
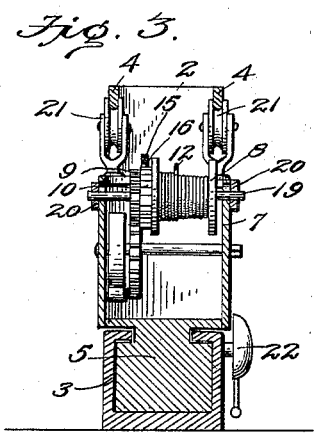
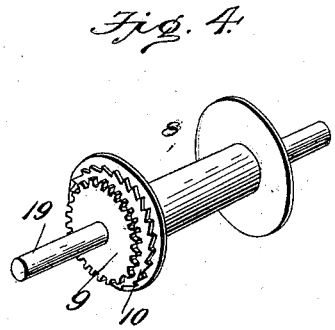
Witnesses  
Inventor  
George Cook  
by H. B. Willson & Co.  
Attorneys

UNITED STATES PATENT OFFICE.

GEORGE COOK, OF LOUISVILLE, KENTUCKY.

AUTOMATIC FISHING DEVICE.

SPECIFICATION forming part of Letters Patent No. 625,829, dated May 30, 1899.

Application filed November 12, 1898. Serial No. 696,293. (No model.)

*To all whom it may concern:*

Be it known that I, GEORGE COOK, a citizen of the United States, residing at Louisville, in the county of Jefferson and State of Kentucky, have invented certain new and useful Improvements in Automatic Fishing Devices; and I do declare the following to be a full, clear, and exact description of the invention, such as will enable others skilled in the art to which it appertains to make and use the same.

My invention relates to an automatic fishing device; and the object is to provide a simple, inexpensive, and effective device of this character.

To this end the invention consists in the construction, combination, and arrangement of the several elements of the device, as will be hereinafter more fully described, and particularly pointed out in the appended claims.

In the accompanying drawings the same reference characters indicate the same parts of the invention.

Figure 1 is a side elevation of my improved automatic fishing device as it appears when set. Fig. 2 is a similar view of the same as it appears when tripped. Fig. 3 is a transverse vertical section. Fig. 4 is a detail view of the reel-shaft.

1 2 denote parallel standards arising from the hollow base 3 and connected at their upper ends by the horizontal brace-rails 4 4.

5 designates a carriage having a longitudinal movement in the base 3, and 6 denotes a spiral spring having one end fixed to said carriage and the other to the base, so that when the carriage is moved forward the spring is expanded and when the carriage is released the spring will withdraw it to the rear end of the frame.

7 denotes the reel-box fixed to the carriage and traveling with it. 8 designates the reel journaled in said box and provided with a gear-wheel 9, which is driven by a spring-actuated train of gearing mounted in the reel-box.

10 denotes a ratchet-wheel on the reel, and 12 denotes the fishing-line wound on the reel in the usual manner.

13 denotes a bell-crank lever fulcrumed on a rock-shaft 14, journaled in the forward standards and having its horizontal arm 15 formed with a tooth 16, which engages the ratchet-wheel 10 on the reel-box when the carriage is run forward, as shown in Fig. 1.

The outer arm 17 of the bell-crank lever extends diagonally forward and is provided with V-shaped notches 18 to receive the line, which after being cast is drawn comparatively taut and a bight or loop made at this point and held in one of the notches 18, so arranged that when the free end of the line is drawn forward—as, for instance, when a fish strikes the hook—the arm 17 is drawn down and the arm 15 is thrown up to simultaneously release the reel and the reel-box, the spring 6 drawing the carriage and reel-box back. This action withdraws the loop or bight of the line out of the notch in the arm 17 and permits the reel to wind up the line under the influence of the spring-actuated gearing.

The shaft 19, on which the reel is mounted, is journaled in two parallel arms 20 20, which are pivoted to the reel-box, and this permits the gear-wheel 9 to be thrown into and out of mesh with the contiguous gear-wheel on the train of gearing. One end of the reel-shaft 19 is square and is preferably of the same size as the winding-shaft, so that the same key may be used on both.

The upper end of the reel-box is provided with trolley-wheels 21 21, which engage the brace-rails 4 4 to facilitate the travel of the carriage, and 22 denotes an alarm-gong fixed on the frame and having its trip-lever projecting into the path of the reel-box, so that when it slides back under the influence of the spring 6 it strikes the trip-lever and sounds the alarm.

It will be understood that various changes in the form, proportion, and the minor details of construction may be resorted to without departing from the spirit or sacrificing any of the advantages of this invention.

Having thus described my invention, what I claim, and desire to secure by Letters Patent, is—

1. In combination, the frame, the spring-actuated carriage traversing said frame, the reel-box carried by said carriage, the spring-actuated reel journaled in said box, and a bell-crank lever fulcrumed in said frame and in operative connection therewith, and in the path of said reel-box, substantially as shown and described.

2. In combination, the frame, the spring-actuated carriage traveling in said frame, the reel-box mounted on said carriage, and a spring-actuated alarm-gong fixed on the frame and having its trip-lever projecting into the path of said reel-box and operated by the movement thereof, substantially as and for the purpose set forth.

In testimony whereof I have hereunto set my hand in presence of two subscribing witnesses.

GEORGE COOK.

Witnesses:
WM. PRICE,
JOSEPH BIBB.